Dec. 23, 1958     A. A. PRICE     2,865,536
SPREADER FOR FERTILIZER AND THE LIKE
Filed May 17, 1955
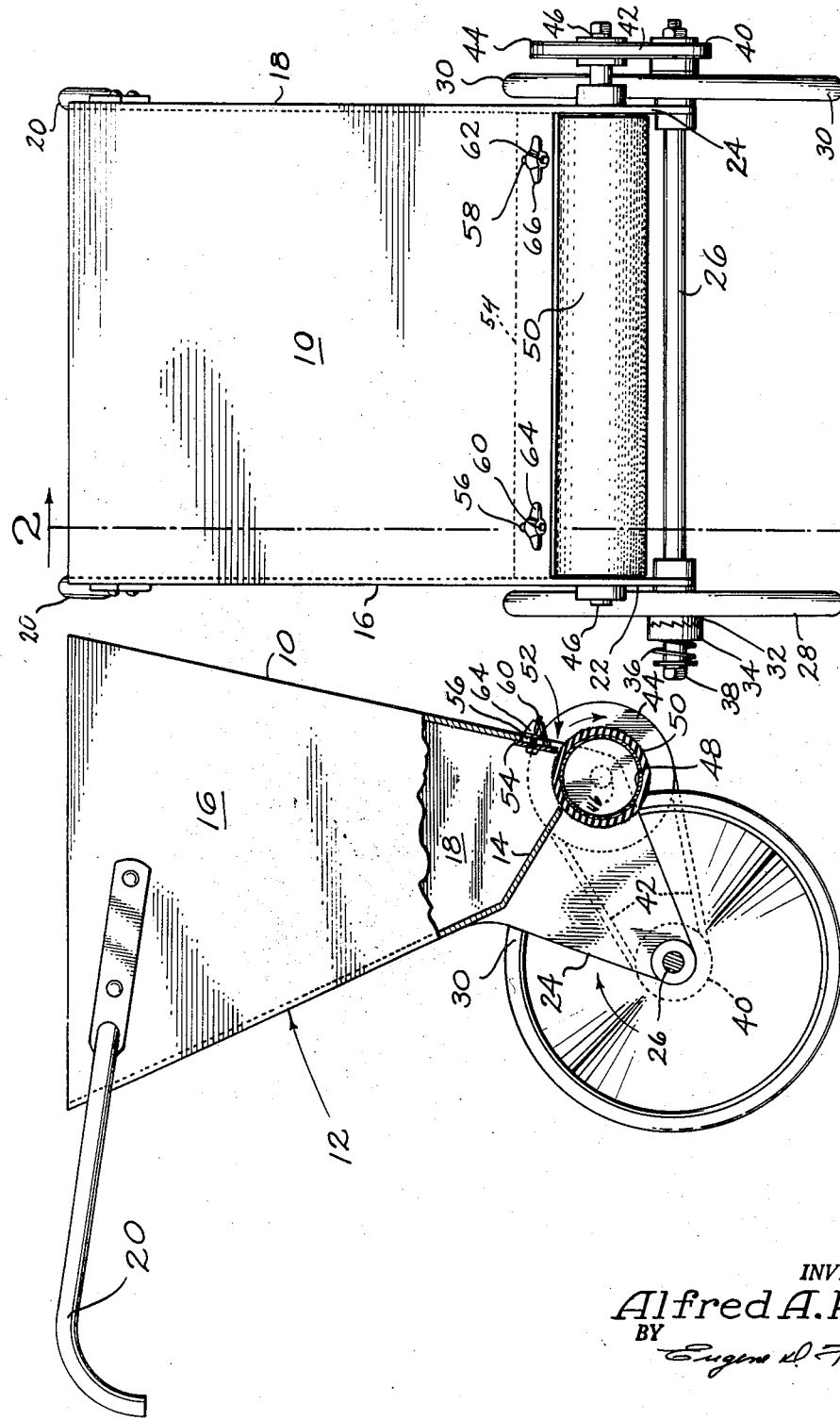
INVENTOR.
*Alfred A. Price*
BY

SPREADER FOR FERTILIZER AND THE LIKE

Alfred A. Price, Tacoma, Wash.

Application May 17, 1955, Serial No. 508,840

1 Claim. (Cl. 222—177)

This invention relates to fertilizer spreaders and the like and pertains particularly to spreaders of the class employed for applying commercial fertilizers to lawns, gardens, row crops, etc.

The conventional spreaders for applying pulverulent commercial fertilizers, for example the common cart type lawn spreader, include a hopper having an open bottom across which rotates an agitator wheel. This has for its function the agitation of the powdered material within the opening, facilitating its downward passage through the opening. However, the spreaders of this class are characterized by the inherent disadvantage that they do not operate properly when the fertilizer contains lumps, rocks, sticks or other large objects. Also, they will not distribute organic materials such as peat moss satisfactorily. In addition, they tend to clog; do not spread the fertilizer evenly; and are difficult to clean.

Accordingly it is the general object of the present invention to provide a spreader for fertilizer and the like which conveys the fertilizer from the apparatus under a positive impulse and in a uniform stream.

It is another object of this invention to provide a spreader for fertilizer and the like which will not clog readily and which is unaffected by the presence of stones, sticks and lumpy material in the feed.

It is still another object of this invention to provide a fertilizer spreader which also is adaptable for use with non-pulverulent materials such as peat moss.

A further object of this invention is the provision of a fertilizer spreader which spreads the fertilizer uniformly and continuously and in which the fertilizer can not hang up or arch.

Still another object of this invention is to provide a spreader for fertilizer and like materials which is easy to clean.

The manner in which the foregoing and other objects of this invention are accomplished will be apparent from the accompanying specifications and claim considered together with the drawings wherein like numerals refer to like parts and wherein:

Fig. 1 is a view in front elevation of the presently described spreader; and

Fig. 2 is a view in side elevation, partly in section, of the herein described spreader.

Generally stated, the herein described fertilizer spreader comprises a vehicle which supports a hopper having an open bottom. A rotor is stationed across the open bottom of the hopper and forms with one side thereof a restricted dispensing opening. The rotor has a rough peripheral surface preferably of stippled rubber.

Disconnectable drive means are connected to the rotor for driving it in the direction of the restricted opening. The rotor thereupon conveys the fertilizer which rests upon it through the opening at a controlled and uniform rate and under a positive drive.

Considering the foregoing in greater detail and with particular reference to the drawings:

In the illustrated embodiment the spreader of this invention comprises a wheeled cart which includes a hopper for holding the fertilizer or other material to be distributed. The hopper comprises a front side wall 10 and a back side wall 12, the bottom portion of which is formed with an angled section 14. The latter section serves as a partial floor to the hopper, supporting a substantial proportion of the weight of the hopper contents and thus facilitating the spreading operation. It also directs the flow of the hopper contents in the direction of the spreading mechanism.

The hopper includes further a pair of end walls 16, 18 to which are attached handles 20 extending rearwardly of the spreader. The end walls have formed integrally therewith, or attached thereto, the rearwardly and downwardly extending plates 22, 24 which serve as brackets or mounting means for the wheels and for the spreading mechanism.

A shaft 26 is journaled in plates 22, 24. It carries wheels 28, 30 which are mounted rotatably on the shaft and turn independently of it.

In addition to assisting in supporting the spreader, wheel 28 serves as a drive means for the spreading unit. Accordingly its exterior hub is provided with a ratchet member 32. A companion ratchet member 34 is slidably mounted on an outwardly directed extension of shaft 26. It is maintained resiliently pressed against ratchet member 32 by means of compression spring 36 mounted on the shaft and retained there by nut 38. The inclination of the teeth on the ratchet members is such that when wheel 28 rotates in a first direction, for example, forwardly, the ratchet teeth are engaged and drive shaft 26. However, when the wheel is rotated in a second direction, for example, rearwardly, then the ratchet teeth slip over each other and shaft 26 remains stationary.

Shaft 26 has keyed to it a pulley 40 which carries a drive belt 42. The drive belt in turn engages a pulley 44 keyed to a shaft 46 which is journaled in plates 22, 24, at a location ahead of and spaced apart from shaft 26.

A spreading rotor or roller 48 is mounted rigidly on shaft 46 so that it turns with the shaft. This roller is of sufficient diameter to span the opening at the bottom of the hopper and thus in effect forms a continuation of angled section 14 of rear side wall 12 in providing a floor for supporting the pulverulent contents of the hopper. Also, it is so located with respect to section 14 that the latter section directs the flow of powdered material contained in the hopper onto the upper surface of the roller.

The roller surface is roughened in order to move the fertilizer under a positive force from the hopper, as opposed to merely permitting it to gravitate outwardly therefrom. The surface thus may assume the form of corrugations or other irregularities in the roller surface. However, it preferably is provided by covering the roller with a surface layer 50 of stippled rubber or other resilient material.

The provision of such a resilient, uneven, surface is of substantial importance to the successful operation of the herein described spreader. In the first place, the inherent resiliency of the material serves to draw the powdered fertilizer through the restricted opening and to discharge it from the spreader. In the second place, the resilient stippling or other projections provide a rough surface which will not clog or become plugged with loose powdered material. If this occurred, the recesses between the projections soon would fill with caked, powdered fertilizer so that a smooth rotor surface would be formed. This would defeat the purpose of the invention since such a surface would not draw the material from the hopper satisfactorily.

In the present invention, however, the resilient action of the stippling or projections causes them to stretch and be deformed during operation of the apparatus. This action dislodges any powdered material which may accumulate in the recesses between the projections. As a result, the roller surface is maintained in the desired and necessary roughened condition over long operating periods.

The position of roller 48 relative to the opening in the bottom of the hopper also is important. Thus the roller should be positioned in such a manner that it is in substantial contact with the lower end of angled section 14 of rear side wall 12. This seals off this side of the opening so that the finely divided fertilizer or other material can not pass therethrough.

Also, as noted above, section 14 is angled in the direction of rotation of the roller and is substantially tangential thereto. Accordingly, it serves a guiding function, guiding the contents of the hopper to the working section of the roller surface and assisting in the spreading operation.

Still further, roller 48 is positioned with respect to front side wall 10 of the hopper in such a manner that an opening 52 of controllable size is left between the lower end of the side wall and the surface of the roller. This opening serves as a dispensing opening through which the powdered material is dispensed and distributed by the motion of the roller.

Means advantageously may be provided for adjusting the size of opening 52. The illustrated means for accomplishing this purpose comprise a plate 54 overlying inside surface of front side wall 10. Plate 54 lies in a plane parallel to that of the front side wall and is provided with spaced slots 56, 58.

Bolts 60, 62 penetrate or extend outwardly from plate 54 and pass through slots 56, 58. Externally located wing nuts 64, 66 then are threaded on the bolts so that the plate may be tightened in any one of a plurality of advanced or retracted stations relative to side wall 10. Hence it is possible to vary the size of the dispensing opening as desired to provide a stipulated spread of the hopper contents.

In operation, the hopper of the herein described spreader is filled with powdered commercial fertilizer, peat moss, or other material, which rests in part on the angled section 14 of rear side wall 12, and in part on the upper surface of roller 48. Dispensing opening 52 is set to the desired width by adjustment of plate 54. The spreader then is pushed forwardly, whereupon ratchet members 32, 34 are interengaged and wheel 28 drives roller 48 in clockwise direction as viewed in Fig. 2.

As the roller rotates, its roughened, resilient surface drives the hopper contents through opening 52, this positive action being promoted by the inherent resiliency of the stippled rubber covering 50 of the roller. As a result, the material is dispensed uniformly at a rate which is determined by the speed of movement of the roller, the size of opening 52, and the ratio of the diameters of pulleys 40, 44. Accordingly a precise control of the dispensing rate may be obtained, making the spreader adaptable for use in dispensing and spreading materials of varied particle size and physical properties.

Also, the resiliency of the projections of the stippled rubber covering surface 50 results in their repeated deformation during operation of the spreader. This in turn serves to prevent caking of the powdered material in the depressions between the projections. Consequently the surface is maintained continuously in the desired roughened condition.

Still further, if stones, sticks, or lumps of the fertilizer are present in the hopper, these can not interfere with the action of the rotor which continues its dispensing action regardless of the presence of foreign objects of these and other classes.

It is to be understood that the form of my invention herewith shown and described is to be considered as a preferred example of the same and that various changes in shape, size and arrangement of parts may be resorted to without departing from the spirit of the invention or the scope of the subjoined claim.

Having thus described my invention, I claim:

In a spreader for fertilizer and the like having a hopper including front and back walls, the lower portion of the back wall being angled in the direction of the front wall but terminating short of joining said front wall to form an open bottom for the hopper, a rotor mounted for rotation below the open bottom of the hopper in close proximity to the end of the angled section of the back wall but spaced apart from the lower end of the front wall, thereby forming a dispensing opening, means for adjusting the size of the dispensing opening, a pair of spaced brackets extending downwardly from the hopper, a shaft journaled for rotation between the brackets, a pair of wheels mounted for rotation on the shaft, ratchet means interengaging one of the wheels and the shaft upon rotation of the wheel in one direction, but permitting free rotation of the wheel independently of the shaft in the other direction, and coupling means interconnecting the shaft and the rotor for driving the latter upon engagement of the ratchet means, the improvement which comprises an outer thickness of stippled rubber material for said rotor, said material being compressible through said thickness and said thickness having a rough and irregular peripheral surface comprising a plurality of preformed projections capable of resilient deformation for loosening and dislodging fertilizer in the areas adjacent the projections to prevent caking of the fertilizer.

References Cited in the file of this patent

UNITED STATES PATENTS

| | | |
|---|---|---|
| 632,891 | Burnett | Sept. 12, 1899 |
| 679,298 | Cole | July 30, 1901 |
| 1,043,124 | Melton et al. | Nov. 5, 1912 |
| 1,770,437 | Simpson | July 15, 1930 |
| 2,159,554 | George | May 23, 1939 |
| 2,237,504 | Roath | Apr. 8, 1941 |
| 2,733,838 | Neff | Feb. 7, 1956 |
| 2,760,682 | Ingram | Aug. 28, 1956 |